Nov. 17, 1931.  E. SACHS  1,832,792
DEVICE FOR DETERMINING THE SPECIFIC GRAVITY OF LIQUIDS
Filed July 27, 1926
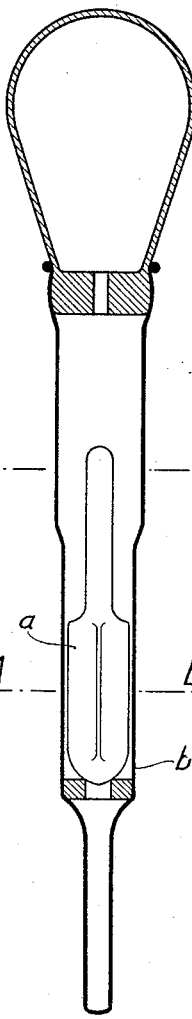

Patented Nov. 17, 1931

1,832,792

UNITED STATES PATENT OFFICE

EDGAR SACHS, OF STUTTGART, GERMANY, ASSIGNOR TO ROBERT BOSCH AKTIEN-GESELLSCHAFT, OF STUTTGART, GERMANY

DEVICE FOR DETERMINING THE SPECIFIC GRAVITY OF LIQUIDS

Application filed July 27, 1926, Serial No. 125,293, and in Germany October 26, 1925.

The invention relates to instruments for measuring the specific gravity of liquids, and particularly for measuring the density of liquids in electric batteries.

Hitherto the float or hydrometer proper was provided with projections, by means of which the float was to be guided in its vessel or housing. In a suitable constructional form of the housing said projections can insure the float against rotary movements, which would render difficult the reading off of the graduation of the float.

However said projections make the float expensive, and render it liable to break; further it is difficult to make said projections sufficiently exact in measure. These drawbacks are avoided according to the present invention by providing the float with outer edges extending in the longitudinal direction of the same. Such glass shapes can be produced easily and exact in measure by a plurality of known methods. The float for instance can have the shape of a triangular or square prism, while the housing may be cylindrical. Advantageously however the housing too is provided with inner guideways, extending also in the longitudinal direction of the same so that the float is guided by its outer edges in the inner guideways of the housing, whereby it is insured against rotary movements.

In the accompanying drawings in which a preferred form of construction of the device, which can be used simultaneously as a syringe, is illustrated Fig. 1 shows a longitudinal section through the whole device, while Fig. 2 is a cross section on line A—B of Fig. 1, and Fig. 3 a cross section on line C—D of Fig. 1.

As it may be seen from Fig. 2 the float $a$ in cross section has the shape of an equilateral triangle and the lower part of the pipette-like glass tube $b$ in cross section has the shape of an equilateral hexagon. Each longitudinal edge of the float $a$ is guided in a longitudinal guideway of the tube $b$, while the ascension of the liquid is effected in the intermediate space formed by the three remaining corners of the tube $b$.

As glass cylinders having a polygonal cross sectional shape can be produced with great exactness, floats and housings can be easily exchanged, which however is not possible in the devices known up to now on account of the slight exactness of measure of the present floats.

It will be apparent, of course, that numerous changes may be made in the particular embodiment herein shown without departing from the spirit and scope of the invention.

I claim:

1. Device for determining the specific gravity of liquids, which comprises in combination, a housing and a hydrometer float arranged in said housing, said float being polygonal in cross section and said housing being also polygonal in cross section, the total number of the sides of the polygon represented by a cross section of said housing being a multiple of the number of sides of the polygon represented by a cross section of said float, the edges of the float extending into and being guided by corners of said housing.

2. Device for determining the specific gravity of liquids as claimed in claim 1, in which the sides of the polygon, representing a cross section of the float, are substantially coincident with lines joining alternate vertices of the polygon representing a cross section of said houseing.

3. Device for determining the specific gravity of liquids, which comprises in combination a housing and a hydrometer float arranged in said housing, said float having a triangular cross sectional shape and said housing having in its lower half a hexagonal cross section shape, in which each edge of said float is adapted and arranged to be guided longitudinally by guideways formed in the interior of the lower half of said housing by the intersection of its sides at alternate vertices of said hexagonal cross section.

In testimony whereof I have hereunto affixed my signature.

EDGAR SACHS.